Dec. 18, 1945.　　　E. L. CRANDELL　　　2,391,085
THERMIONIC OSCILLATOR
Filed Sept. 28, 1943　　　2 Sheets-Sheet 1

Inventor.
Ervin L. Crandell.
by John F. Smith
Attorney.

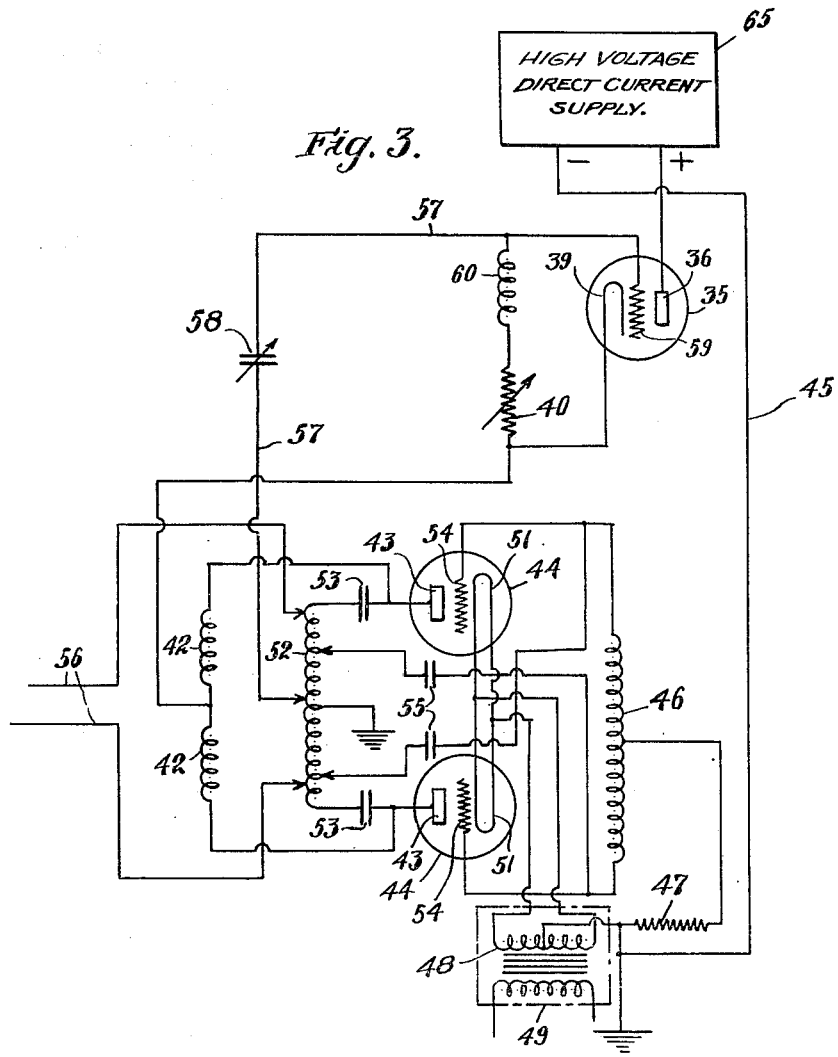

Patented Dec. 18, 1945

2,391,085

UNITED STATES PATENT OFFICE 2,391,085

THERMIONIC OSCILLATOR

Ervin L. Crandell, Wellesley, Mass., assignor to Compo Shoe Machinery Corporation, Boston, Mass., a corporation of Delaware Application September 28, 1943, Serial No. 504,127

8 Claims. (Cl. 250—36)

This invention relates to thermionic oscillators and has as an object the maintaining of the output voltage from a thermionic oscillator substantially constant during variations in the power output thereof.

Thermionic oscillators may be used for providing high frequency alternating currents for dielectric heating. My U. S. Patent No. 2,321,130 which issued June 8, 1943, discloses the use of such oscillators for the heating of adhesive between shoe parts. When the load upon such an oscillator increases, the high frequency voltage delivered thereby tends to decrease. This invention automatically compensates for variations in the output of such an oscillator by adjusting the direct current voltage supplied to the oscillator anode.

In one embodiment of this invention a thermionic tube having a control grid between its cathode and anode, rectifies alternating current and supplies the rectified current to the anode of a thermionic oscillator. High frequency current from the oscillator is fed through a coupling condenser to the grid of the rectifier tube and is rectified and variations in the voltage thereof are used to bias the grid negative an amount proportional to increases in the high frequency voltage. This causes the direct current voltage supplied to the oscillator anode to decrease and results in the high frequency voltage decreasing conformably, thus holding the high frequency voltage substantially constant throughout the range of design output.

In a modification of said embodiment, a thermionic rectifier tube has its cathode and anode connected in series with the high voltage direct current supply to the anode of a thermionic oscillator. The control grid of the rectifier tube is connected through a coupling condenser to the anode of the oscillator, and is connected to the cathode of the rectifier tube through a grid bias resistor. Increases in the high frequency voltage from the oscillator result in increases in the voltage drop in the grid resistor and in increases in the negative bias on the rectifier grid resulting in a decrease in the direct current voltage supplied through the rectifier tube to the oscillator anode.

Figure 1:
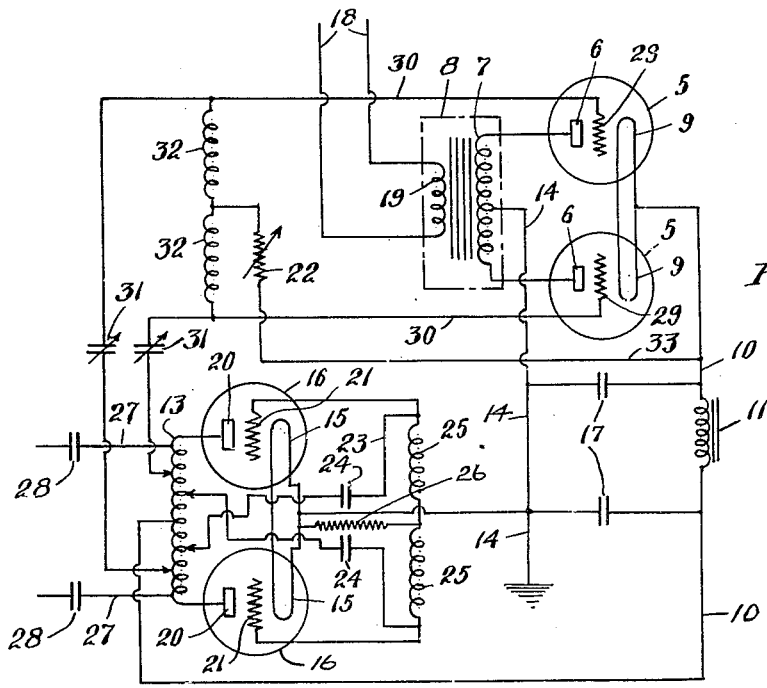
Figure 2:
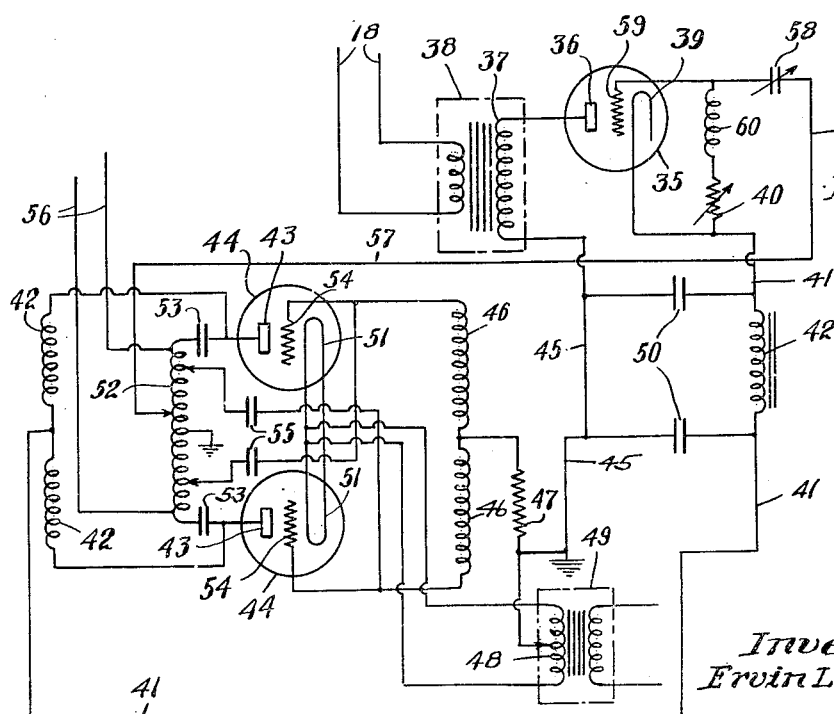

The invention will now be described with reference to the drawings, of which:

Fig. 1 is a diagrammatic view of one embodiment of the invention in which push-pull, triode, rectifier tubes rectify alternating current and supply the rectified current to the anodes of oscillator tubes connected in push-pull, and adjust the direct current voltage in accordance with changes in the high frequency voltage delivered by the oscillator tubes;

Fig. 2 is a diagrammatic view of another embodiment of the invention in which a single triode rectifier tube rectifies alternating current which is supplied to the anodes of push-pull oscillator tubes, the increases in the high frequency voltage from the oscillators providing increases in the negative bias of the grid of the rectifier tube resulting in decreases in the direct current voltage supplied to the oscillators, and Fig. 3 is a diagrammatic view of a modification of the circuit of Fig. 2 in which a single triode tube acts as a voltage regulating tube and has its cathode and anode connected in series with a separate high voltage direct current supply to push-pull oscillators.

Referring now to Fig. 1, the triode rectifier tubes 5 have their anodes 6 connected to the opposite ends of the secondary 7 of the transformer 8. The cathodes 9 of the tubes are connected together and are connected by the wire 10 and the choke coil 11 to the center tap of the oscillator tank coil 13. The center of the transformer secondary 7 is connected by the wire 14 to the cathodes 15 of the oscillator tubes 16. The filter condensers 17 are connected between the wires 10 and 14 on the opposite sides of the choke coil 11. The wire 10 is thus the positive voltage supply wire and the wire 14 is the negative wire supplying rectified current to the oscillator tank coil 13. The alternating current to be rectified, is supplied through the wires 18 to the transformer primary 19.

The anodes 20 of the oscillator tubes 16 are connected to the opposite ends of the tank coil 13 and their grids 21 are connected by the wires 23 and the coupling condensers 24 to taps on the tank coil 13. The grids 21 of the oscillator tubes 16 are interconnected by the radio frequency chokes 25 which are connected in series and which are connected at their point of interconnection to the bias resistor 26 which in turn is connected to the cathodes 15 of the oscillator tubes. The tank coil is connected by the wires 27 and coupling condensers 28 to the work circuit electrodes which may be the shoe cementing electrodes illustrated by my said patent.

The oscillator and rectifier circuits described so far are conventional ones, the value of the rectified current supplied to the oscillators and the frequency of the current delivered to the work circuit by the oscillators, depending as is well known to those skilled in the art, upon the values and characteristics of the circuit components which have been described.

The grids 29 of the rectifier tubes 5 are connected by the wires 30 and the coupling condensers 31 to the oscillator tank coil 13 adjacent the opposite ends thereof. The grids 29 are interconnected by the radio frequency choke 32, the electrical center of which is connected by the bias resistor 22 and the wire 33 to the cathodes of the rectifier tubes 5.

The radio frequency currents from the oscillator tubes 16 are applied through the wires 30 and the coupling condensers 31 to the grids 29 of the rectifier tubes 5 and are rectified in the tubes 5. The direct current resulting from the rectified radio frequency currents is applied from the cathodes 9 of the rectifier tubes, through the bias resistor 22 and the wire 33 to the center tap of the radio frequency choke 32. The opposite ends of the choke 32 are negative when the end of the bias resistor 22 which is connected by the wire 33 to the cathodes 9 is positive, with the result that the rectified radio frequency currents from the oscilators produce voltage drops which bias the grids of the rectifier tubes negative amounts proportional to the values of the radio frequency voltages. When the radio frequency voltages increase in value, the negative bias on the grids is increased and when the radio frequency voltage decreases, the negative bias on the grids is decreased conformably. The bias voltage also depends, of course, upon the value of the bias resistor 22 which may be adjusted for properly biasing the grids 29.

An increase in the negative bias on the grids of the rectifier tubes causes decreased space current within the tubes and this results in decreased rectified voltage delivered by the rectifier tubes to the oscillator tubes. This in turn results in a decrease in the radio frequency voltage from the oscillator tubes. Thus an increase or decrease in the radio frequency voltage from the oscillator tubes causes a decrease or increase respectively in the rectified voltage supplied to the anodes. Thus a decrease in the rectified voltage supplied to the oscillator anodes caused by an increase in the radio frequency voltage from the oscillators, causes the radio frequency voltage to decrease. The radio frequency voltage at the oscillators thus is maintained substantially constant during load changes.

With reference to Fig. 2, the triode rectifier tube 35 has its anode 36 connected to one end of the secondary winding 37 of the transformer 38. The other end of the winding 37 is connected to the negative wire 45. The cathode 39 of the tube 35 is connected to one end of the bias resistor 40 and through the wire 41 and choke coil 42, to the interconnected ends of the radio frequency chokes 42. The other ends of the chokes 42 are connected to the anodes 43 of the oscillator tubes 44. The wire 45 is connected to one end of the bias resistor 47, to the center tap of the secondary 48 of the transformer 49 which supplies current to the cathodes 51 of the oscillator tubes 44, and to ground. The other end of the bias resistor 47 is connected to the center tap of the oscillator grid inductance 46. The usual filter condensers 50 are connected between the wires 41 and 45 on the opposite sides of the filter choke.

The oscillator tank coil 52 has its electrical center grounded and its ends are connected through the coupling condensers 53 to the anodes 43 of the oscillator tubes 44. The grids 54 of the oscillator tubes 44 are connected to the ends of the grid inductance 46 and through the coupling condensers 53 to the tank coil 52. The wires 56 connect the tank coil to the work circuit electrodes.

The circuit including the rectifier tube 35 and the oscillator tubes 44 described in the foregoing, is a conventional one using a single ended rectifier tube for supplying rectified current to the anodes of push-pull oscillators.

The tank coil 52 is connected from one side of its ground connection, through the wire 57 and the coupling condenser 58, to the grid 59 of the rectifier tube 35. The radio frequency choke 60 is connected to the grid 59 of the tube 35, and to the opposite end of the bias resistor 40 from that connected to the rectifier cathode 39.

In operation, the radio frequency currents from the oscillator tank coil 52 are supplied through the wire 57 and the coupling condenser 58 to the rectifier grid 59. These currents are rectified within the tube 35 and the resulting direct current voltages are positive at the end of the bias resistor 40 which is connected to the cathode 39 and are negative at the end of the radio frequency choke 60 which is connected to the rectifier grid 59. Increases in the radio frequency voltages from the oscillators 44 result in increased negative bias on the grid 59 resulting in decreased space current in the tube 35 and in decreased voltage of the rectified current supplied to the oscillator anodes 43, thus compensating for the rise in the radio frequency voltage.

Fig. 3 illustrates a modification of the control circuit of Fig. 2 which may be used for regulating the radio frequency voltage delivered by an oscillator when a source of high voltage direct current is at hand. The circuit is similar to that of Fig. 2 except that the tube 35 does not rectify the low frequency alternating current for providing direct current to the oscillator tube anodes but does rectify the radio frequency currents from the oscillators as described in connection with Fig. 2, so that similar components in Figs. 2 and 3 have been given the same reference characters.

Referring now to Fig. 3, the cathode 39 and the anode 36 of the tube 35 are connected in series with the direct current supply source 65 and the anodes 43 of the oscillator tubes 44. The direct current lead from the source 65 is connected to the anode 36 of the tube 35 and the cathode 39 of the tube 35 is connected to the point of interconnection of the radio frequency chokes 42 through which the direct current is supplied to the anodes 43 of the oscillator tubes. The space current drawn by the oscillator tubes 44 flows as space current between the cathode 39 and the anode 36 of the control tube 35. An increase in the radio frequency voltage from the oscillator tubes 44 causes as described in connection with Fig. 2, the grid 59 of the tube 35 to be biased negative an amount proportional to the increase in radio frequency voltage. This increases the resistance within the tube 35 to the flow of space current and results in a reduction in the direct current voltage supplied from the source 65 through the tube 35 to the anodes 43 of the oscillator tubes 44, thus compensating for the rise in radio frequency voltage.

As disclosed in my said patent, an oscillator frequency of, for example, 20 megacycles may be generated by the oscillator described herein.

While push-pull oscillator circuits have been described, the invention is applicable to single ended oscillators and to push-pull or single ended rectifier and voltage regulating tubes.

While embodiments of the invention have been described for the purpose of illustration, it should be understood that the invention is not limited to the exact apparatus and circuits illustrated, as modifications thereof may be suggested by those skilled in the art without departure from the essence of the invention.

What is claimed is:

1. In combination, a high frequency, thermionic oscillator tube having an anode with a tank coil connected thereto and having a work circuit connected to said coil; a thermionic rectifier tube having a cathode, a grid and an anode; means including means connecting said cathode and said anodes in series for supplying direct current to said first mentioned anode; means including a bias resistor connecting said grid and cathode, and means including a coupling condenser connecting said tank coil and said grid whereby alternating currents supplied from said coil to said grid are rectified in said rectifier tube and produce voltage drops in said resistor, and increases in the alternating current voltage from said coil caused by decreases in the load in said work circuit, cause increases in the negative bias on said grid and reductions in the voltage of the current supplied to said first mentioned anode.

2. In combination, a high frequency, thermionic oscillator tube having an anode with a tank coil connected thereto and having a work circuit connected to said coil; a thermionic rectifier tube having a cathode, a grid and an anode; means including means connecting said cathode and said anodes in series for supplying direct current to said first mentioned anode; means including a radio frequency choke in series with a bias resistor connecting said grid and cathode, and means including a coupling condenser connecting said tank coil and said grid whereby alternating currents supplied from said coil to said grid are rectified in said rectifier tube and produce voltage drops in said resistor, and increases in the alternating current voltage from said coil caused by decreases in the load in said work circuit, cause increases in the negative bias on said grid and reductions in the voltage of the current supplied to said first mentioned anode.

3. In combination, a high frequency, thermionic oscillator tube having an anode with a tank coil connected thereto and having a work circuit connected to said coil; a thermionic rectifier tube having a cathode, a grid and an anode; means applying low frequency alternating current to said rectifier tube for rectification therein; means connecting said cathode with said oscillator anode for supplying the rectified current thereto; means including a bias resistor connecting said grid and cathode, and means including a coupling condenser connecting said tank coil and said grid whereby alternating currents supplied from said coil to said grid are rectified in said rectifier tube and produce voltage drops in said resistor, and increases in the alternating current voltage from said coil caused by decreases in the load in said work circuit, cause increases in the negative bias on said grid and reductions in the voltage of the current supplied by said rectifier tube to said first mentioned anode.

4. In combination, a high frequency, thermionic oscillator tube having an anode with a tank coil connected thereto and having a work circuit connected to said coil; a thermionic rectifier tube having a cathode, a grid and an anode; means applying low frequency alternating current to said rectifier tube for rectification therein; means connecting said cathode with said oscillator anode for supplying the rectified current thereto; means including a radio frequency choke in series with a bias resistor connecting said grid and cathode, and means including a coupling condenser connecting said tank coil and said grid whereby alternating currents supplied from said coil to said grid are rectified in said rectifier tube and produce voltage drops in said resistor, and increases in the alternating current voltage from said coil caused by decreases in the load in said work circuit, cause increases in the negative bias on said grid and reductions in the voltage of the current supplied by said rectifier tube to said first mentioned anode.

5. In combination, a high frequency, thermionic oscillator tube having an anode with a tank coil connected thereto and having a work circuit connected to said coil; a thermionic rectifier tube having a cathode, a grid and an anode; a high voltage direct current source; means including means connecting said cathode, said anodes and said source in series for supplying direct current to said first mentioned anode; means including a bias resistor connecting said grid and cathode, and means including a coupling condenser connecting said tank coil and said grid whereby alternating currents supplied from said coil to said grid are rectified in said rectifier tube and produce voltage drops in said resistor, and increases in the alternating current voltage from said coil caused by decreases in the load in said work circuit, cause increases in the negative bias on said grid and reductions in the voltage of the current supplied to said first mentioned anode.

6. In combination, a high frequency, thermionic oscillator tube having an anode with a tank coil connected thereto and having a work circuit connected to said coil; a thermionic rectifier tube having a cathode, a grid and an anode; a high voltage direct current source; means including means connecting said cathode, said anodes and said source in series for supplying direct current to said first mentioned anode; means including a radio frequency choke in series with a bias resistor connecting said grid and cathode, and means including a coupling condenser connecting said tank coil and said grid whereby alternating currents supplied from said coil to said grid are rectified in said rectifier tube and produce voltage drops in said resistor, and increases in the alternating current voltage from said coil caused by decreases in the load in said work circuit, cause increases in the negative bias on said grid and reductions in the voltage of the current supplied to said first mentioned anode.

7. In combination, a high frequency, thermionic oscillator tube having an output work circuit connected thereto; a thermionic rectifier tube having a cathode, a grid and an anode; means supplying low frequency, high voltage, alternating current to said rectifier tube for rectification therein, means supplying the rectified direct current from said rectifier tube to said oscillator, and means including means deriving high frequency current from said work circuit and supplying same to said rectifier tube for biasing said grid with negative voltage conformable with increases in the voltage of the high frequency current supplied to said circuit whereby the direct current voltage provided by said rectifier tube is decreased upon increases in the voltage of the high frequency current from said circuit.

8. In combination, a rectifier for low frequency, high voltage, alternating current, an oscillator for generating high frequency alternating currents, connected to said rectifier for receiving rectified current therefrom, and means including means for supplying alternating current from said oscillator to said rectifier for adjusting the voltage of the current delivered thereby to said oscillator in accordance with changes in the voltage of the alternating current supplied by said oscillator to said rectifier.

ERVIN L. CRANDELL.